(12) United States Patent
Nagasawa

(10) Patent No.: US 6,827,544 B2
(45) Date of Patent: Dec. 7, 2004

(54) SUCTION CONTROL UNIT IN A PLATE SUCTION AND LIFTING DEVICE

(75) Inventor: Atsuo Nagasawa, Inuyama (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 109 days.

(21) Appl. No.: 10/073,896

(22) Filed: Feb. 14, 2002

(65) Prior Publication Data

US 2002/0131853 A1 Sep. 19, 2002

(30) Foreign Application Priority Data

Mar. 14, 2001 (JP) ........................................ 2001-071413

(51) Int. Cl.$^7$ ................................................ B25J 15/06
(52) U.S. Cl. .................... 414/752.1; 294/64.1; 294/907; 901/40; 901/46
(58) Field of Search ................................. 414/627, 737, 414/752.1, 225.01; 294/64.1, 65, 907; 901/40, 46; 271/91, 92, 95, 96

(56) References Cited

U.S. PATENT DOCUMENTS

| | | | | |
|---|---|---|---|---|
| 4,703,925 A | * | 11/1987 | Jelinek et al. | 271/11 |
| 4,787,662 A | * | 11/1988 | Dewez | 294/64.1 |
| 5,207,553 A | * | 5/1993 | Konagai | 414/737 |
| 5,297,830 A | * | 3/1994 | Hoke | 294/65 |
| 5,324,087 A | * | 6/1994 | Shimose et al. | 294/64.1 |
| 5,471,445 A | * | 11/1995 | Emberty et al. | 369/30.29 |
| 5,609,377 A | * | 3/1997 | Tanaka | 294/65 |
| 6,123,502 A | * | 9/2000 | Adams et al. | 414/752.1 |
| 6,454,332 B1 | * | 9/2002 | Govzman et al. | 294/64.1 |

FOREIGN PATENT DOCUMENTS

JP         8-192236        7/1996

* cited by examiner

Primary Examiner—Dean J. Kramer
(74) Attorney, Agent, or Firm—Westerman, Hattori, Daniels & Adrian, LLP

(57) ABSTRACT

A suction control unit in a plate suction and lifting device that can suck and lift even the plate with process holes or the corrugated plate by finding the suckable flat part of the plate. A suction control unit 1 controls a plate suction and lifting device 2 for lifting a plate W by sucking the flat part of the plate W by a suction pad 4. The suction control unit 1 is equipped with a suction pressure detector 19 and a retry control unit 29. The retry control unit 29 detects the suction pressure of the suction pad 4. The retry control unit 29 sucks the plate again if the suction pressure of the suction pressure detector 19 does not reach the set pressure when the suction pad 4 sucks the plate W. This suction is implemented again by changing the flat part of the plate W sucked by the suction pad 4.

2 Claims, 5 Drawing Sheets

SUCTION CONTROL UNIT IN A PLATE SUCTION AND LIFTING DEVICE

FIELD OF THE INVENTION

The present invention relates to a suction control unit in a plate suction and lifting device, which sucks and lifts a plate etc. with holes that are processed by a punch press etc. in carrying.

BACKGROUND OF THE INVENTION

A punch press machine makes holes in a material plate and cuts the plate into a plurality of product plates having holes in it. Though holes are not always made, a plurality of the product plates having holes in it is generally made from a large-sized material plate. Each material plate processed like this is lifted by the plate suction and lifting device such as a loader that is equipped with a vacuum suction pad and is carried to the next process.

A vacuum suction pad sometimes fails to lift a plate, as the suction pressure cannot be increased when a part of the pad is located on a hole in sucking the product plate. When using what is termed a multi-pad composed by a plurality of the micro pads as the vacuum suction pad, the product plate may be lifted up as other micro pad sucks the plate even if a part of the micro pad is located on a hole position. However, even in the case, there is a limit according to the hole size etc.

It is also considered that the pad sucks the product plate other than the holes after the hole position of the product plate is taught to the plate suction and lifting device in advance, but it is difficult to teach the respective hole positions of the product plates regularly and it is not easy to secure the reliability of the teaching data.

It is an object of the present invention to solve the aforementioned problem and to provide a suction control unit in a plate suction and lifting device that can suck and lift a plate having a process hole or a corrugated plate by finding a suckable flat part.

SUMMARY OF THE INVENTION

The summary of the present invention will be described with reference to FIG. 1 corresponding to the preferred embodiment. A suction control unit 1 in this plate suction and lifting device controls the suction of a lifting device 2 of a plate W2 by sucking the flat part of the plate W2 by using a suction pad 4, and has a suction pressure detecting means 19 for detecting the suction pressure of the suction pad 4 and a retry control unit 29. If the suction pressure of the suction pressure detecting means 19 does not reach the set pressure when sucking the plate W2, the retry control unit 29 changes the flat part of the plate W2 for being sucked by the suction pad 4 and controls the plate lifting device 2 in order to suck again.

According to this arrangement, if the suction pressure of the suction pad 4 detected by the suction pressure detecting means 19 does not reach the set pressure such that there is the process hole in the position of the plate W2 sucked by the suction pad 4, the retry control unit 29 changes the suction position of the suction pad 4 and sucks the plate again. So, the suction pad 4 can suck the plate with process holes or the corrugated plate by choosing the other flat part and the error of sucking and lifting the plate W2 can be reduced to the utmost.

According to the present invention, the plate suction and lifting device 2 is equipped with a travel body 5 traveling to at least one direction X-direction along the flat direction of the plate W2 between a table 9 for placing the plate W2 and a next process plate discharging part B for placing the plate W2 discharged from this table 9, and this travel body 5 may have the suction pad 4. In this case, the retry control unit 29 can change the flat part of the sucking plate W2 by moving the travel body 4.

If arranged like this, the positions of a plurality of the suction pads are changed in one time unlike the device for moving the suction pad 4 to the travel body 5, so that the arrangement becomes simpler.

Moreover, the travel body 5 can be moved to any direction along the flat direction of the plate W2.

If arranged like this, the position for sucking the suction pad 4 to the plate W2 can be changed easily to either direction, X direction or Y direction.

DETAILED DESCRIPTION OF THE PREFERRED EMBODIMENTS

Figure 1:
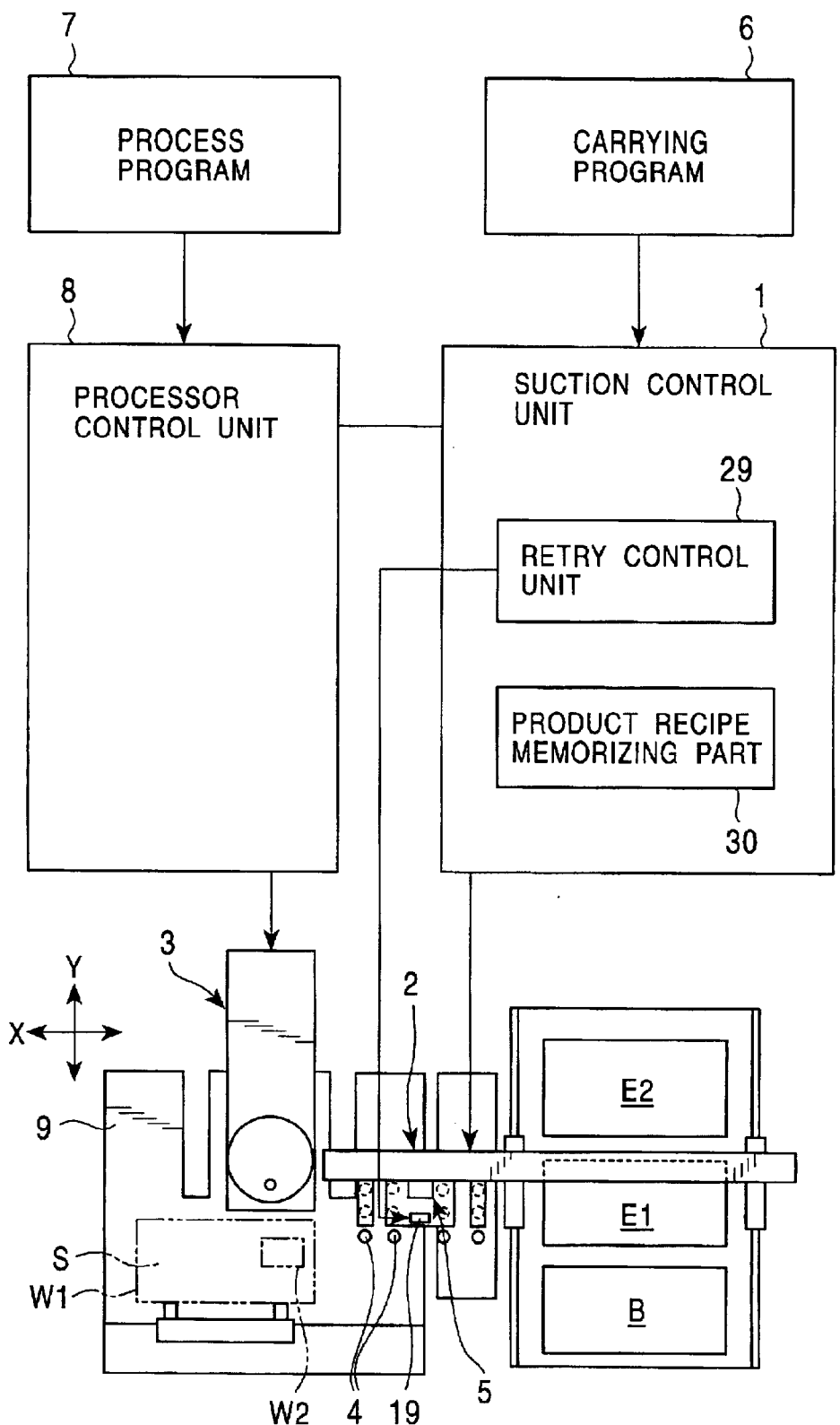
FIG. 1 is a block diagram illustrating a concept of a plate process system equipped with a suction control unit in a plate suction and lifting device according to one preferred embodiment of the present invention.

One preferred embodiment of the present invention will be described with reference to FIG. 1 to FIG. 7.

A suction control unit 1 controls the suction movement of a plate suction and lifting device 2 for sucking and lifting a plate W2. The plate suction and lifting device 2 comprised of a plate loader has a plurality of a suction pads 4 for sucking the plate W2 and a travel body 5 installing these suction pads 4. The plate suction and lifting device 2 carries the product plate W2 which is cut one by one from a large-sized material plate W1 by a plate processor 3 from the plate processor 3 to a discharging area B that is the next process plate discharging part by implementing a carrying program 6 in the suction control unit 1. A process program 7 controls the plate processor 3 in a processor control unit 8.

Figure 2:
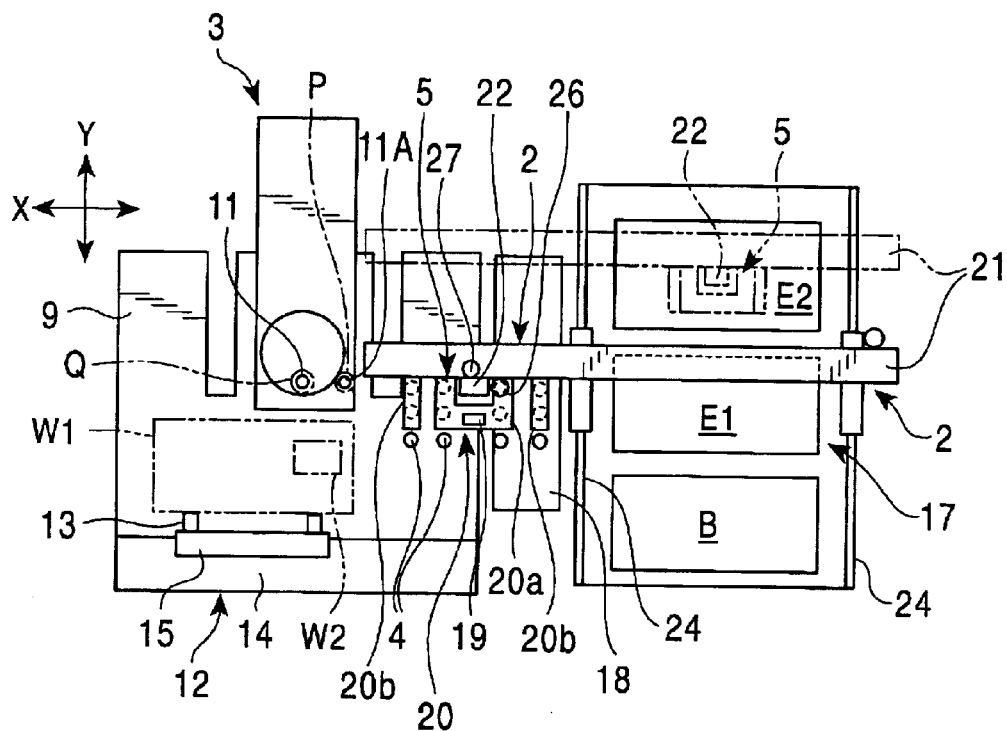
FIG. 2 is a top view of a working part in the system.
Figure 3:
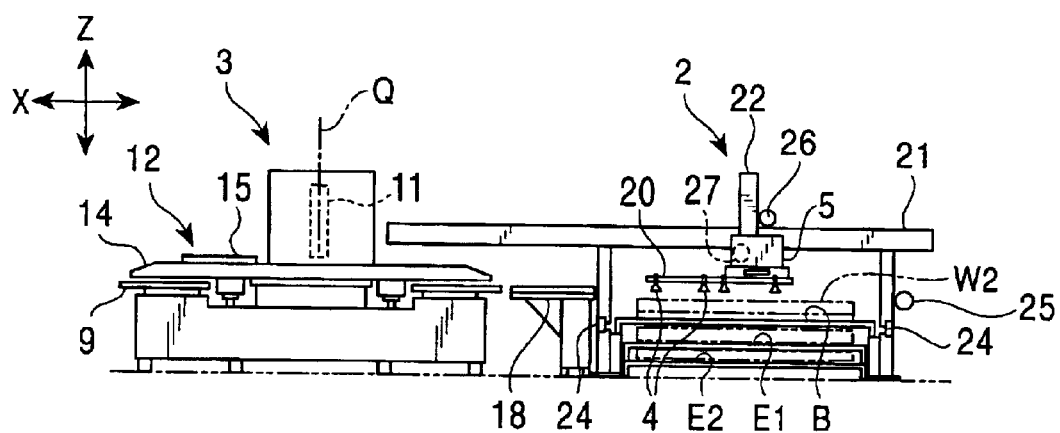
FIG. 3 is a front view of the working part in the system.
Figure 4:
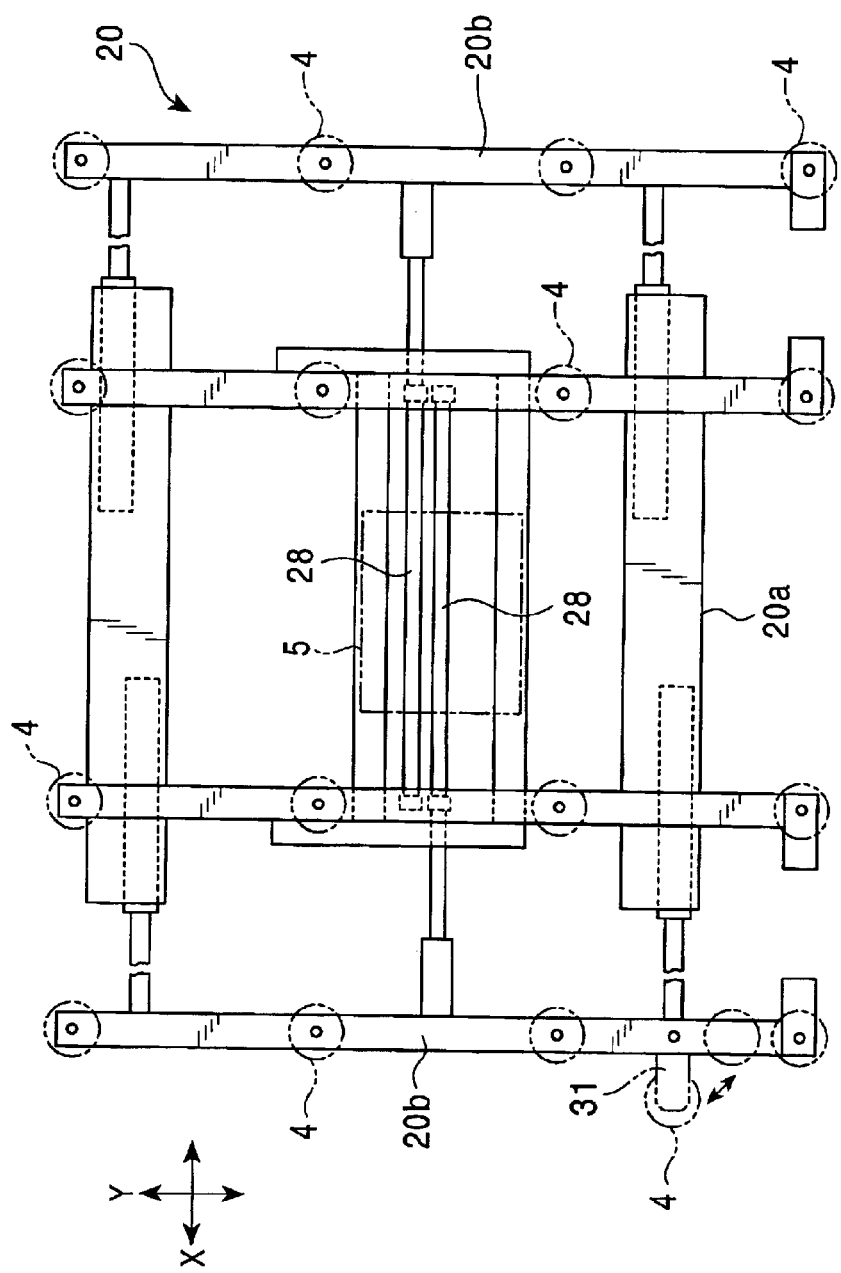
FIG. 4 is a top view illustrating the arrangement of a suction pad of the plate suction and lifting device.

The concrete example of the plate processor 3 and the plate suction and lifting device 2 composing the plate process system will be described with reference to FIG. 2 and FIG. 3. The plate processor 3 can cut out a plurality of the product plates W2 from the large-sized material plate W1 on a table 9. The plate processor 3 is illustrated as the punch press in the drawings, but the other laser beam machine etc. is also available. The plate processor 3 is equipped with a processing means 11 for processing the material plate W1 in a process position Q and a feed means 12 for moving the material plate W1 on the table 9. Moreover, the plate processor 3 is equipped with a processing means 11A for finally cutting off the product plate W2 from the material plate W1 in a position P lining with the process position Q. The processing means 11A becomes the subhead, so it is not necessary provided. The feed means 12 for moving the material plate W1 to the right and left directions (X-direction) and the front and back directions (Y-direction) gripped by a work holder 13, places a cross slide 15 moving to the right and left directions in a carriage 14 moving back and front and installs a plurality of the work holders 13 in a cross slide 15.

A plate storage unit 17 is provided next to the plate processor 3 and an assistant table 18 is installed between them. The plate storage unit 17 is provided by setting the product discharging area B for discharging the product plate W2, a material plate accumulation area E1 and a remainder discharging area E2 in line. Each area B, E1, E2 is composed on the upper surface of the palette in the state that the movable palette is stopped in the predetermined position to the lining direction of these areas.

The plate suction and lifting device 2 makes the suction pad 4 movable to the 3-axial directions, the back and front direction (Y-axis direction), the right and left direction (X-axis direction) and the up and down direction (Z-axis direction). The suction pad 4 is composed of the vacuum suction pad connected to a suction device (not shown in the drawings). A plurality of the suction pads 4 is provided in a pad support frame 20 installed elevatably in the travel body 5 by lining them two-dimensionally and can suck the plate W from the upper surface. The suction pressure detecting means 19 for detecting the suction pressure when sucking the product plate W2 by the suction pad 4 is provided in the pad support frame 20.

The travel body 5 is installed to move freely in a rail part extended to the right and left directions of a movable carriage 21, and the travel body 5 can move right and left, and back and forth by the back and forth movement of the movable carriage 21, and the right and left movement of the travel body 5. A lifting body 22 is elevatably installed in the travel body 5 and the pad support frame 20 is installed in the bottom of the lifting body 22. The movable carriage 21 can move freely on a rail 24 provided in both right and left sides of the plate storage device 17 and it is driven to move freely by a Y-axis driving force 25. An X-axis driving force 26 and a Z-axis driving force 27 respectively controls the travel body 5 traveling right and left and the lifting body 22 lifting. The servomotor etc. is used in the driving forces 25~27 of each axis.

The pad support frame 20 can change the size of the arrangement range of the suction pad 4. To be more precise, the pad support frame 20 has a fixed frame part 20a and a movable frame part 20b as illustrated in the plain view of FIG. 4 and the suction pad 4 is installed in the respective frame parts 20a, 20b. A pair of the movable frame parts 20b is provided in the both right and left sides of the fixed frame part 20a, and it is installed to move freely in the right and left direction in the respective size-changeable driving forces 28 and it is driven elastically by the respective size-changeable driving forces 28. A fluid pressure cylinder device is used in the size-changeable driving force 28.

A part (for example, one piece) of the suction pad 4 in the vicinity of the front corner part of the side edge in the plate processor 3 side out of the suction pad 4 aligned two-dimensionally is provided unevenly from the pad support frame 20 to the side through a part advance mechanism 31, and can partly change the size of the arrangement range of the suction pad. The part advance mechanism 31 installs the suction pad 4 in a revolving arm that freely revolves evenly, and moves to the positions that the suction pad 4 is projected and that it is sucked by revolving this revolving arm to the two opposite directions by the driving force such as the air cylinder. The suction pad 4 provided in the part advance mechanism 31 is used in a projected manner in case that the product plate W2 is small etc.

FIG. 1 illustrates the suction control unit 1 that is a computer type unit having a numerical control function and a sequence control function and has a retry control unit 29. The retry control unit 29 controls the plate suction and lifting device 2 in order to suck the plate again by changing the flat part of the product plate W2 sucked by the suction pad 4 in case that the suction pressure detected by the suction detecting means 19 does not reach the set pressure when the suction pad 4 sucks the product plate W2. The suction control unit 1 and the retry control unit 29 implement the control as illustrated in the flow chart of FIG. 5.

The movement of the plate suction and lifting device 2 in the above arrangement will be described.

First, the operational outline of the carry in-and-out will be described. The material plate W1 is loaded in a laminated manner in the material plate accumulation area E1 of the plate storage device 17 in FIG. 1. When the material plate W1 is carried into the plate processor 3, the travel body 5 is moved to the X, Y directions so as to come the suction pad 4 group on the material plate accumulation area E1. In this state, after the material plate W1 is sucked by each suction pad 4 by moving the pad support frame 20 of the travel body 5 downward, the pad support frame 20 moves upward again.

The material plate W1 is carried in the predetermined carrying position on the table 9 of the plate processor 3 by moving the travel body 5 to the X, Y directions in the state that the material plate W1 is sucked by the suction pad 4 of the travel body 5.

In the plate processor 3, the material plate W1 is processed by the processing means 11 and the material plate W2 is cut out from the material plate W1.

Figure 5:
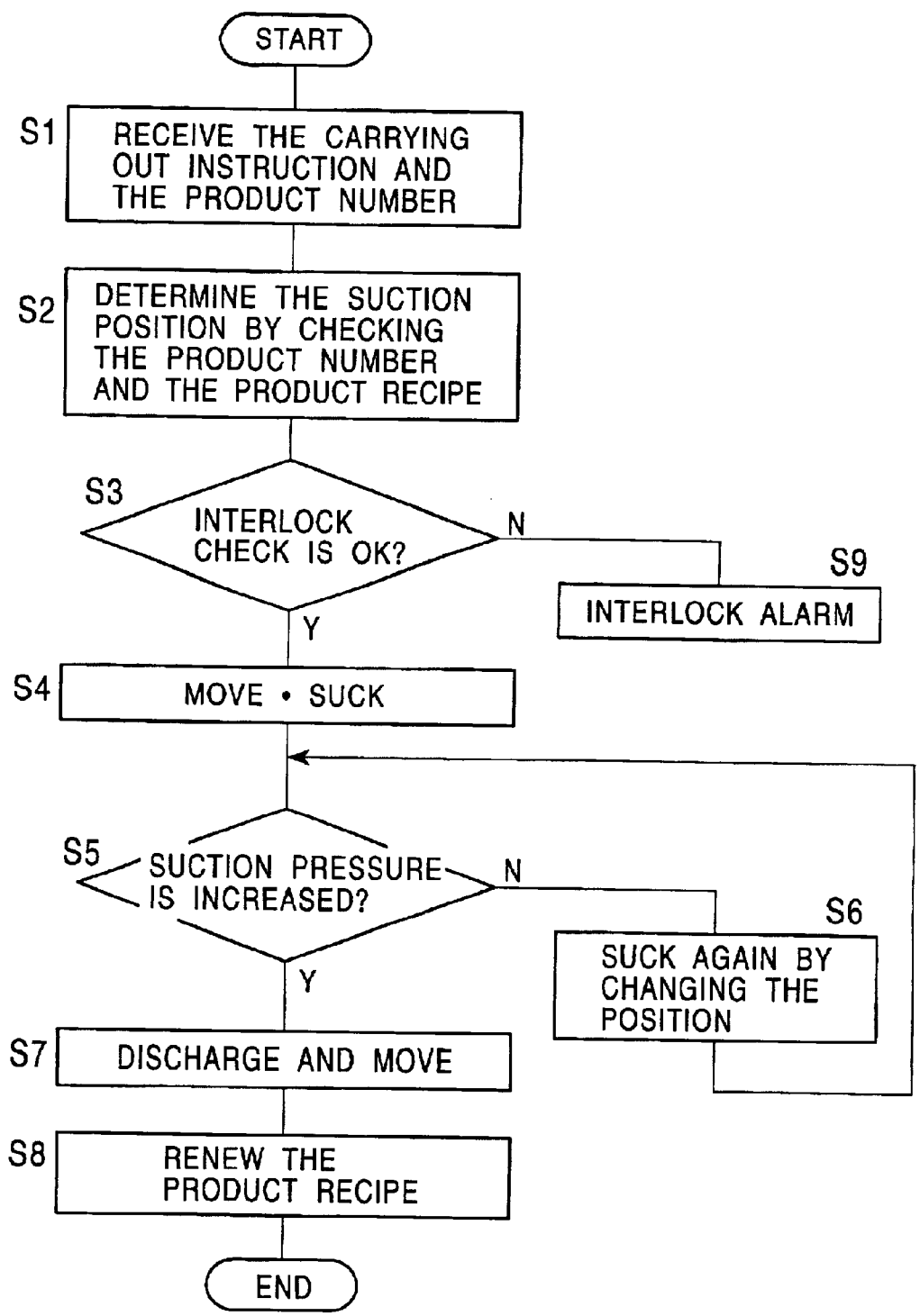
FIG. 5 is a flow chart illustrating an operational outline of the plate suction and lifting device.

The carrying out of the product plate W2 is implemented like the flow chart illustrated in FIG. 5.

When cutting out the product plate W2, the suction control unit 1 receives the carrying out instruction and the product number of the product plate W2 that is cut off from the processor control unit 8 (step S1). In response to this, the suction control unit 1 checks the received product number and the product recipe of the product plate W2 of each kind registered in a product recipe memorizing part 30 provided in the suction control unit 1, reads out the product recipe corresponding to the received product number and determines the carrying out position of the product plate W2, that is the suction position of the suction pad 4 in the product plate W2 from the product recipe (step S2). In this case, the product recipe means that the outline of the product plate W2 which is cut out on the table 9 of the plate processor 3 is expressed as the coordinate value data (x, y), for example.

Next, the suction control unit 1 checks the interference of a travel path (step S3). In other words, whether or not the plate suction and lifting device 2 can move without interfering with the obstacle such as a part of the plate processor 3 in the middle of the carrying-out route by moving the suction pad 4 to the suction position determined as described above and lifting the product plate W2 is confirmed based on the data of the travel route registered in advance. This interference check is interlocked, and in case of the interference, the interlock alarm is generated without operating the product plate W2 (step S9).

When confirming that the plate suction and lifting device 2 does not interfere with the obstacle by the interference check, the suction control unit 1 sucks the product plate W2 by moving the suction pad 4 downward after moving the plate suction and lifting device 2 in order to suck the plate in the determined suction position (step S4).

The retry control unit 29 in the suction control unit 1 determines whether or not the suction pressure of the suction pad 4 detected by the suction pressure detecting means 19 reaches the set pressure (step S5). The suction pressure detecting means 19 may output the pressure value as the detecting output or may output the on-and-off signal that shows whether or not it reaches the set pressure. In case of outputting the on-and-off signal, the retry control unit 29 determines whether or not the suction pressure reaches the set pressure by the on-and-off signal.

Figure 7:
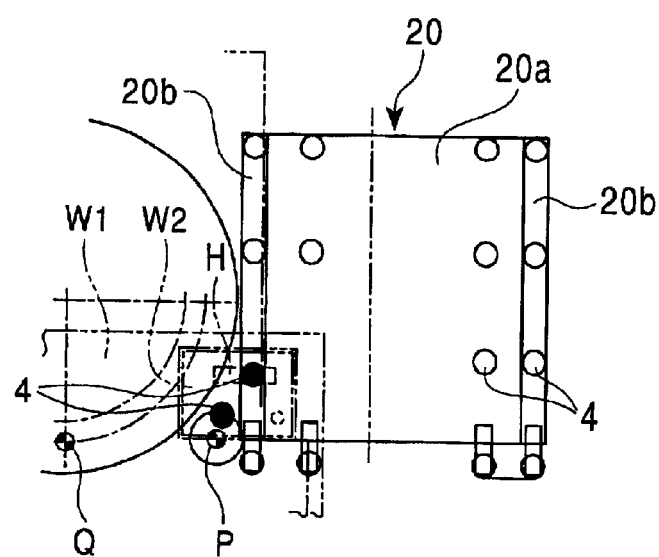
FIG. 7 is an explanation drawing illustrating one example of the positional relation between the product plate and the suction pad.

If the suction pressure does not reach the set pressure as there is a process hole H in the suction area in determining the pressure as illustrated in FIG. 7, for example, the retry control unit 29 sucks the plate again by changing the flat part of the product plate W2 sucked by the suction pad 4 (step S6). When sucking the plate again, the suction pad 4 is slightly moved upward after releasing the suction of the suction pad 4 and the suction is implemented again after moving the pad downward by changing the position. The elevation of the suction pad 4 is implemented by the moving up and down etc. of the lifting body 22. The change of the suction position is repeated in case that the suction pressure does not reach the set pressure after changing it.

Figure 6:
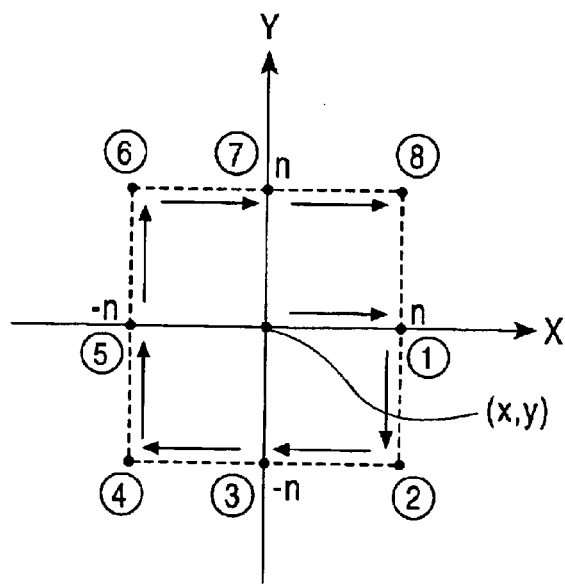
FIG. 6 is an explanation drawing illustrating one example of the procedure of changing a suction position.

FIG. 6 illustrates one example of the changing process of the suction position.

In this example, the suction location is sequentially displaced the prescribed amount every time repeating according to the given rule. To be more precise, when the coordinate of the suction position determined before is (x, y) and the parameter is (n), the coordinate of the suction position after changing is as follows:

the first change: (x+n, y)

the second change: (x+n, y−n)

the third change: (x, y−n)

the fourth change: (x−n, y−n)

the fifth change: (x−n, y)

the sixth change: (x−n, y+n)

the seventh change: (x, y+n)

the eighth change: (x+n, y+n)

More specifically, in this example, the suction position of the suction pad 4 is changed in the order as indicated by the arrows in FIG. 6. The alarm is arranged to ring when the number of change is reached to the predetermined set number though it is not described here. Therefore, the waste is cut such that the change of the suction position to the product plate W2 without possibility of carrying out is repeated and it can recover earlier.

In addition, the suction position is changed basically by moving the travel body 5 to the X, Y directions, but it can also be changed by the adjustment of changing the size of the movable frame 20b. For example, if the suction pad 4 relating to the suction is the suction pad 4 of one movable frame 20b mentioned before, the change to the X direction can be implemented by the adjustment of changing the size of the movable frame 20b. Moreover, the position of a part of the suction pad 4 can be changed by the part advance mechanism 31 in FIG. 4.

When the suction pressure reaches the set pressure by changing the suction position, the product plate W2 is lifted, the travel body 5 is moved onto the product plate discharging area B that is the next process plate discharging part and the product plate W2 is loaded on it (step S7). Additionally, when the suction is succeeded by the change of the suction position, the data of the product recipe at the time is renewed by the data that changes the suction position, and it is arranged to be suckable in one time without changing the position next time (step S8).

According to the suction control unit 1 of this plate suction and lifting device 2 like this, if the suction pressure of the suction pad 4 detected by the suction pressure detecting means 19 does not reach the set pressure such that there is the process hole in the suction position of the product plate W2, the suction pad 4 can suck the plate with process holes or the corrugated plate as the retry control unit 29 sucks the plate again by changing the suction position of the suction pad 4, so that the suction and lifting up error of the product plate W2 can be reduced to the utmost.

Moreover, as the retry control unit 29 changes the flat part of the sucking plate W by moving the travel body 5 in this plate lifting device 2, the positions of a plurality of the suction pads 4 can be changed in one time compared with the device that the suction pad 4 is moved to the travel body 5, and the arrangement becomes easier as there is no need to provide the moving means of the suction pad 4 in the travel body 5.

Moreover, as the travel body 5 can be freely moved to the given direction along the flat direction of the plate W, the suction position of the suction pad 4 to the plate W can be easily changed to any direction.

Additionally, the preferred embodiment of the present invention illustrates the case that the plate suction and lifting device 2 moves between the table 9 of the plate processor 3 and the plate storage unit 17, but the device whose function is just to lift the product plate W2 from the table 9 of the plate processor 3 without moving like that is also available.

Moreover, according to the preferred embodiment of the present invention, the suction pad 4 relating to the suction of the product plate W2 is determined in advance and the suction position of the suction pad 4 is changed to the product plate W2, but the suction position can be changed by selecting the other suction pad 4 as the suction pad 4 relating to the suction, confined to this. The movement of selecting the other suction pad 4 is implemented by the movement of changing the suction pad 4 that gives suction power.

The suction control unit in the plate suction and lifting device of the present invention controls the suction in the device for lifting the plate by sucking the flat part of the plate by the suction pad, and is equipped with the suction pressure detecting means for detecting the suction pressure of the suction pad and the retry control unit for controlling the plate lifting device in order to suck again by changing the flat part of the plate sucked by the suction pad if the suction pressure of the suction pressure detecting means does not reach the set pressure when sucking the plate, so that the unit can suck and lift even the plate with process holes or the corrugated plate by finding the suckable flat part. If the plate suction and lifting device is equipped with the travel body for traveling to at least one direction along the flat direction of the plate between the table for placing the plate and the next process plate discharging part for placing the discharging plate from this table and this travel body is provided with the suction pad and the retry control unit changes the flat part of the suction plate by moving the travel body, the arrangement will become simpler as the position of a plurality of the suction pads can be changed in one time compared with the suction pad moving to the travel body. Further, if the travel body can freely move to the given direction along the flat direction of the plate, the suction position of the suction pad to the plate can be changed easier to any direction.

What is claimed is:

1. A suction control unit in a plate suction and lifting device including a suction pad to suck a flat part of a plate, comprising:

a suction pressure detecting means for detecting suction pressure of the suction pad; and a retry control unit for controlling the plate suction and lifting device so as to have the suction pad displaced and to have the plate suction and lifting device suck the plate again thereby changing a location to be sucked by the suction pad in the flat part of the plate if the suction pressure measured by the suction pressure detecting means does not reach a set pressure when sucking the plate, wherein the plate suction and lifting device is equipped with a travel body for traveling to at least one direction along a flat direction of the plate between a table for placing the plate and a next process plate discharging part for placing the plate discharged from the table and the suction pad is provided in the travel body and the retry control unit changes the flat part of the plate sucked by moving the travel body.

2. A suction control unit in a plate suction and lifting device as in claim 1, wherein the travel body can freely move to the given direction along the flat direction of the plate.

* * * * *